(12) United States Patent
Carle et al.

(10) Patent No.: US 8,011,012 B2
(45) Date of Patent: Aug. 30, 2011

(54) PROGRAM SUBSTITUTION

(75) Inventors: Kevin T. Carle, Mountain View, CA (US); David L. de Heer, Woodside, CA (US); Majd Bakar, Sunnyvale, CA (US); John H. Grossman, IV, Fremont, CA (US); Richard L. Guthrie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1177 days.

(21) Appl. No.: 11/276,227

(22) Filed: Feb. 17, 2006

(65) Prior Publication Data
US 2007/0198839 A1 Aug. 23, 2007

(51) Int. Cl.
H04N 7/025 (2006.01)
H04N 7/167 (2011.01)
(52) U.S. Cl. ........... 726/27; 725/32; 725/27; 725/28; 725/35; 725/31; 380/200; 380/210; 380/255; 380/277; 713/150; 726/28; 726/29
(58) Field of Classification Search .......... 726/27; 725/32; 713/176
See application file for complete search history.

(56) References Cited

U.S. PATENT DOCUMENTS

| 5,235,643 | A  | * | 8/1993  | Anderson et al. ........... 380/33 |
| 6,546,427 | B1 |   | 4/2003  | Ehrlich et al. |
| 6,684,331 | B1 |   | 1/2004  | Srivastava |
| 2002/0019814 | A1 | * | 2/2002 | Ganesan ................ 705/59 |
| 2002/0170053 | A1 | * | 11/2002 | Peterka et al. ............ 725/31 |
| 2002/0194592 | A1 | * | 12/2002 | Tsuchida et al. .......... 725/32 |
| 2003/0066078 | A1 | * | 4/2003  | Bjorgan et al. ........... 725/34 |
| 2004/0168121 | A1 |   | 8/2004  | Matz |
| 2005/0266833 | A1 | * | 12/2005 | Walker ................ 455/414.1 |
| 2006/0200412 | A1 | * | 9/2006  | Fahrny et al. ............ 705/50 |

OTHER PUBLICATIONS

PCT Search Report dated Jul. 3, 2007, relating to Application No. PCT/US2007/001615.

* cited by examiner

Primary Examiner — Kambiz Zand
Assistant Examiner — Imhotep Durham
(74) Attorney, Agent, or Firm — Lee & Hayes, PLLC (57) ABSTRACT

Multiple keys are distributed to multiple clients. The keys provide access to media content. A group of clients are identified to receive substituted media content during a predetermined time period. Modified keys are generated that identify the substituted media content and the predetermined time period. The modified keys are distributed to the group of clients. The modified keys cause the group of clients to receive the substituted media content during the predetermined time period.

20 Claims, 5 Drawing Sheets

PROGRAM SUBSTITUTION

BACKGROUND

Certain types of television content occasionally needs to be "blacked out" in locales for which rights to that content are withheld. For example, certain sporting events are "blacked out" in the geographic region of the event if the sports team doesn't sell all the tickets for the event. In this situation, content providers must not show the local game in the local geographic region. Instead, content providers may show nothing (e.g., a blank screen), a message indicating the program is "blacked out", an advertisement, or substitute video content.

Program substitution occurs when content that is supplied in a particular region must be either removed and replaced by a static message or substitute video content for a limited period of time (e.g., for the duration of a particular sporting event). Existing systems in the cable television industry perform program substitution by switching the physical encoders that provide the content. Since there are hundreds of different locales that might be subject to program "black out" restrictions, cable companies need to dedicate hundreds of special-purpose receiver-decoders to support this functionality. This use of many special-purpose receiver-decoders is expensive and adds to the complexity of the system.

Therefore, it would be desirable to provide a system that is capable of substituting content without requiring the use of many expensive, special-purpose receiver-decoders.

SUMMARY

The systems and methods described herein distribute keys to multiple clients. The keys are used by the clients to gain access to media content. A group of clients is identified that are to receive substituted media content (instead of regularly scheduled content) during a predetermined time period, such as during the scheduled time of a live event. Modified keys are generated that identify the substituted media content and the predetermined time period. These modified keys are distributed to the group of clients, which causes the group of clients to receive the substituted media content during the predetermined time period.

BRIEF DESCRIPTION OF THE DRAWINGS

Similar reference numbers are used throughout the figures to reference like components and/or features.

DETAILED DESCRIPTION

The systems and methods described herein are capable of performing software-based program substitution without requiring large numbers of special-purpose receiver-decoders. As discussed herein, client devices are capable of switching to substituted content based on received instructions, thereby eliminating the need for dedicated hardware to perform such program substitution. Program substitution may also be referred to as "content substitution" or "service substitution". The described systems and methods utilize various groupings of clients based on, for example, geographic region, content to which the clients are subscribed, and the like. Keys are distributed to clients based on groupings and other factors. These keys control client access to various content. These keys also handle "blacking out" of specific content for particular clients or groups of clients for a specific time period.

Particular examples discussed herein refer to specific components in an Internet Protocol Television (IPTV) environment. An IPTV environment includes one or more systems or methods related to, for example, processing video data, image data, audio data, or other entertainment-related data. However, the systems and methods discussed herein may be utilized with other components contained in similar or different operating environments.

Figure 1:
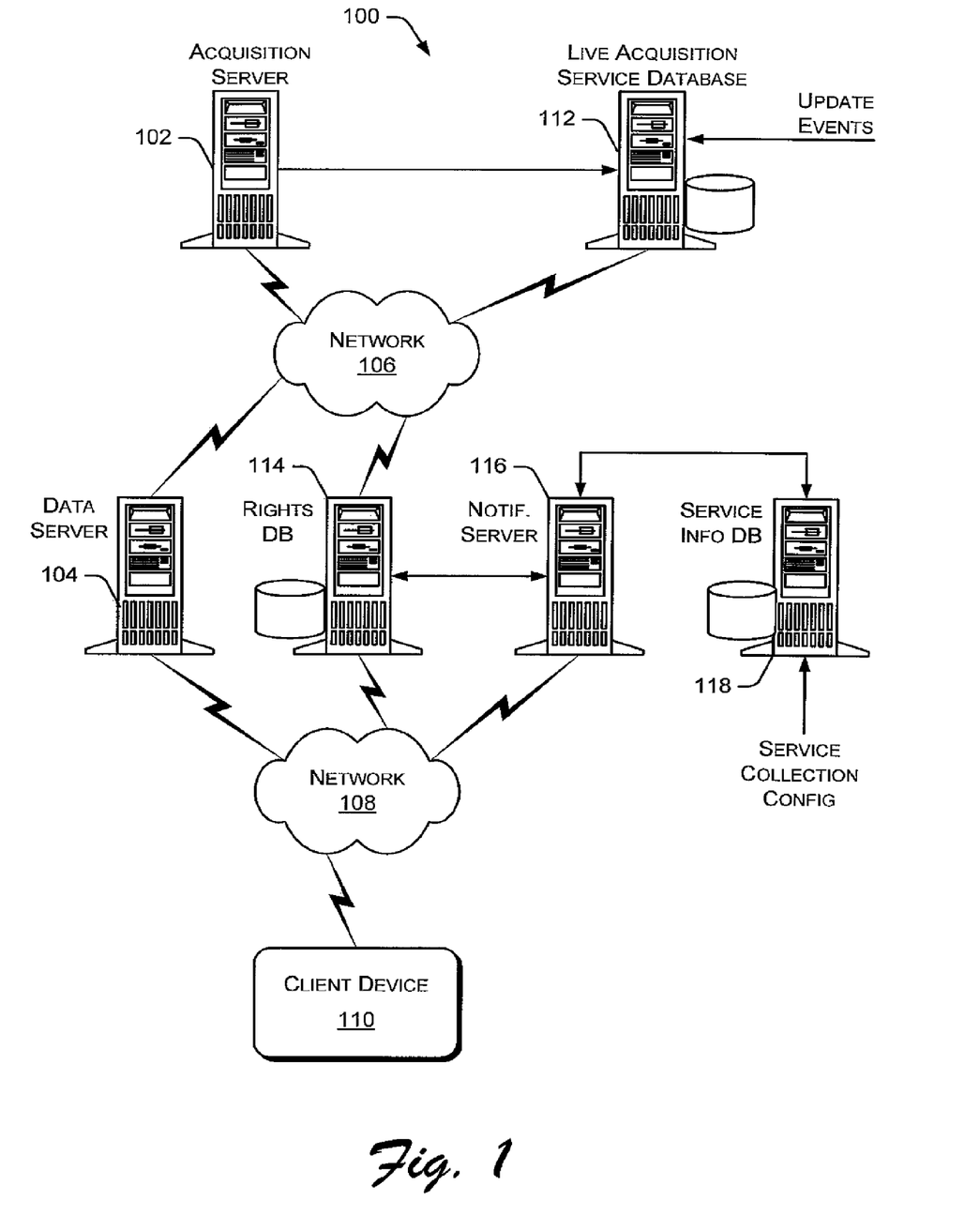
FIG. 1 illustrates an example environment in which the systems and methods discussed herein can be applied.

FIG. 1 illustrates an example environment 100 in which the systems and methods discussed herein can be applied. An acquisition server 102 provides encrypted video streams to a data server 104 via a data communication network 106. In a particular embodiment, data communication network 106 is the Internet. Data server 104 provides the encrypted video streams to one or more client devices 110 via a data communication network 108. In a particular embodiment, data communication network 108 is the Internet. In a specific implementation, data communication network 108 is the same as (or is part of) data communication network 106. Although only one acquisition server 102 is shown in FIG. 1, particular embodiments may include any number of acquisition servers 102 handling any number of video streams.

Acquisition server 102 is also coupled to a live acquisition service database 112, which receives various update events and manages keys and rights associated with particular clients and with groups of clients. Clients may be grouped based on geographic location, types of services to which they are subscribed, and so forth. Live acquisition service database 112 distributes keys and rights data via network 106 to a rights database 114, which is also coupled to network 106. Rights database 114 and a notification server 116 provide various keys and rights information to any number of client devices 110. A service information database 118 receives service collection configuration information and is coupled to notification server 116. In alternate embodiments, service information database 118 is also coupled to rights database 114. Service information database 118 receives information regarding changes in service from, for example, an administrator or other user.

Acquisition server 102 and live acquisition service database 112 may collectively be referred to as an "acquisition point". The acquisition point is the location where the content is acquired prior to distributing the content to the clients. The acquisition point may include, for example, satellite receiving equipment and other receiving equipment for receiving content from any number of different sources. The received content may be immediately distributed to one or more client devices, or may be stored for future distribution.

Data server 104, rights database 114, notification server 116, and service information database 118 may collectively be referred to as a "branch". A particular environment 100 may include any number of branches coupled to an acquisition point. For example, each of the multiple branches is responsible for a particular geographic region or a particular type of client device.

The various servers, databases, and other components shown in FIG. 1 manage and schedule various program substitution events, and use the rights system to control the manner in which client devices are "blacked out". For example, during a "black out" period, client devices may be instructed to display a blank screen or a message indicating that the program is not available. Alternatively, during a "black out" period, client devices may be instructed to display an advertisement or display a different program (e.g., from a different channel). Program substitutions are implemented using a combination of digital rights management (DRM) and notifications to affect the rights and service information for one or more groups of clients. These program substitution events are handled using specific keys for blocking access to certain content during a "black out" period, as discussed in greater detail below.

FIG. 1 illustrates a particular arrangement of various servers, databases, and other components. Alternate embodiments may contain additional components, may delete one or more components, and may arrange components in a different manner, while still maintaining the functionality discussed herein.

There are two types of program substitutions: standard substitution and reverse substitution. Using standard substitution, all client devices within a region are restricted from viewing an event. For example, viewers in Ottawa, Canada cannot watch an Ottawa Senator's home game. Using reverse substitution, all client devices outside of a region are forbidden from viewing an event. For example, only viewers in Ottawa can watch the Ottawa Senators hockey game.

There are two possible results of a substitution: alternate content and a message screen. In the case of alternate content, the viewer is given an alternate content stream for the duration of the program substitution. The alternate content stream will appear in the same guide location as the original content stream. The channel will simply appear to have an alternate show for users in a given geographic area. In the case of a message screen, the viewer in an affected region sees only a static screen that says the subscriber does not have rights to view the specific program.

The schedule for a program substitution may be known in advance, may be known in advance but with variable start and end times, or may not be known in advance with a variable end time. For example, a content provider may know, for example, that from 6:00 pm to 8:00 pm some viewers will see a local game while others will watch the national feed. In another situation, a content provider may know that they intend to start a program substitution around 6:00 pm and end it around 8:00 pm, but the time may vary by several minutes to an hour or more, or is may not happen at all. This is particularly true for service substitutions involving live events like sporting events that can run long or may be rain-delayed.

In another example, a content provider may have a predetermined schedule that needs to be changed at the last minute because a game did not start or finish on time. This can happen, for example, if the start time for a sporting event is delayed due to rain, and the content provider wants to substitute alternate content until the game begins. If the content provider can make these changes in the national feed (without switching to an alternate feed), then no substitution is required.

Program substitution can be handled by scheduled program substitutions or by manual input. In the case of scheduled program substitutions, the IPTV system is notified via a management interface hours or days in advance of a program substitution. The TPTV system then executes the program substitution at the scheduled time. In the case of manual input, a management interface is provided to allow for the manual creation and modification of program substitutions. This interface is typically used at the direction of the affected content provider.

In one embodiment, a Geographic Region Code (GRC) is used to determine the location of a client device for the purposes of substitutions. Alternately, clients can be specified by any "subscriber group". In this embodiment, the affected geographic region for a substitution can be: Single ZIP, FIPS/SAME, or other geographic code, or a Group of ZIP, FIPS/SAME or other geographic codes (typically this is a Geographic Region Code). U.S. operators may use a region code tied to a group of U.S. ZIP Codes as the GRC for substitution regions. The U.S. Zip Code is a 5 digit number. The first three digits represent the Sectional Center or Large City. The final two indicate the post office facility or delivery area. Canadian operators use the Canadian Postal Code as the GRC for substitution regions. The postal code is a six-character alphanumeric code in the format "ANA NAN", where "A" represents an alphabetic character and "N" represents a numeric character. A postal code is made up of two segments: "Forward Sortation Area" (FSA) and "Local Delivery Unit" (LDU).

Figure 2:
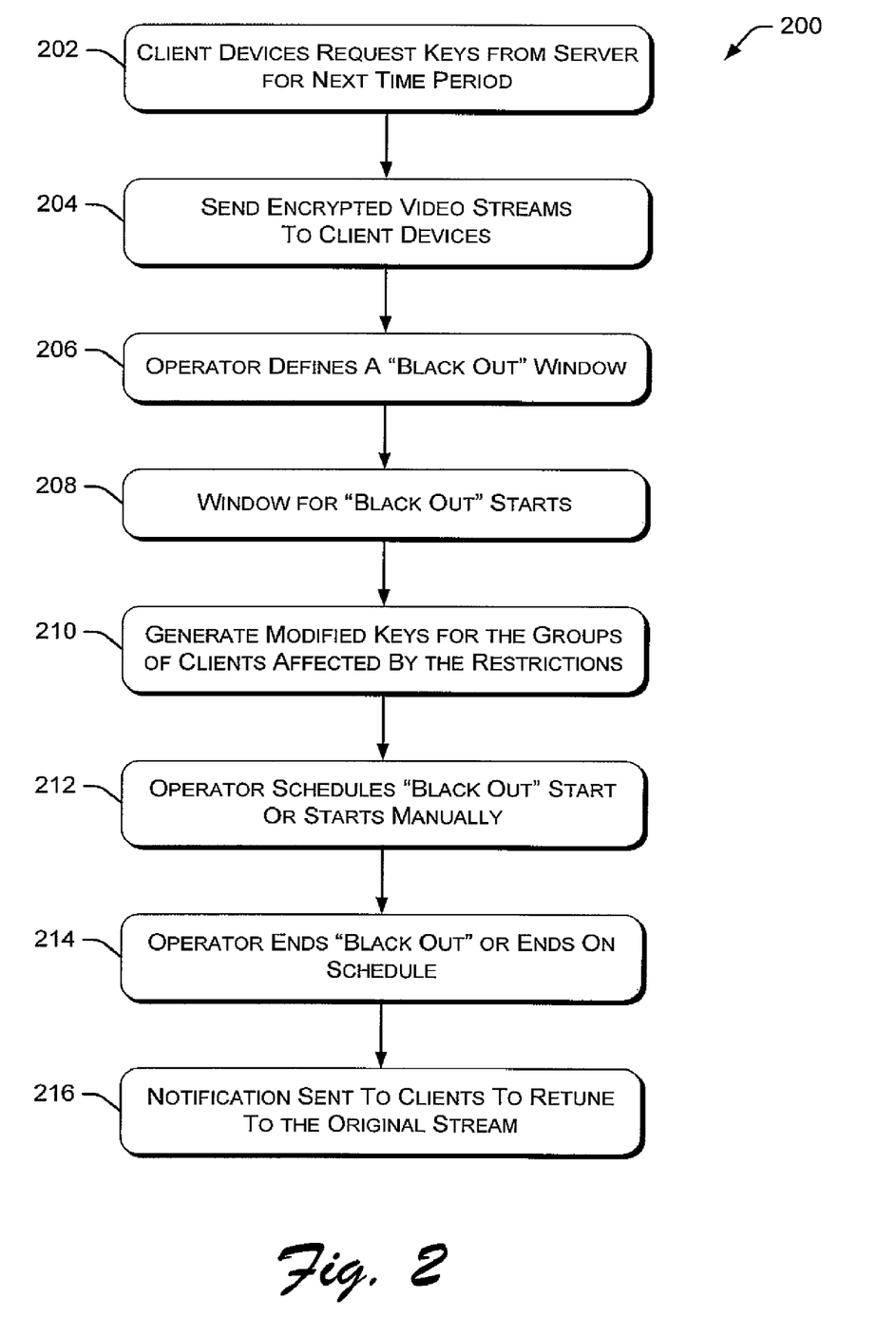
FIG. 2 is a flow diagram illustrating an embodiment of a procedure for preparing to "black out" specific content at specific client devices.

FIG. 2 is a flow diagram illustrating an embodiment of a procedure 200 for preparing to "black out" specific content at specific client devices. Initially, client devices request keys from a server for the next time period (block 202). At the same time, encrypted video streams are being sent to the client devices (block 204). The keys are used by the client devices to gain access to the encrypted video streams provided to the client devices by various servers. Particular keys (or sets of keys) may be distributed to clients based on client groupings. Clients may be grouped based on geographic location, client type, client subscriptions, and the like.

Procedure 200 continues as an operator defines a "black out" window (block 206). The "black out" window defines the clients or group of clients that are not permitted to access the restricted content. The "black out" starts at a particular time (block 208). The procedure then generates modified keys for the groups of clients affected by the "black out" restrictions (block 210). These modified keys prevent particular clients from accessing the restricted content during the restricted time period. Next, the operator schedules the "black out" to start or it starts manually (block 212). A notification is sent to the client about the "black out". At the same time, the acquisition server starts putting the blackout ID in the encrypted video stream. Each client receives its first packet encrypted with the blackout ID. The client checks to see if its key has the blackout ID. If so, it continues as normal. If not, the client retunes to the alternate content.

The operator then ends the "black out" or it ends on schedule (block 214). At this point, the acquisition server stops putting the blackout ID in the video stream. Notification is then sent to the clients to retune to the original video stream (block 216). This procedure is repeated for future "blackout" windows.

Figure 3:
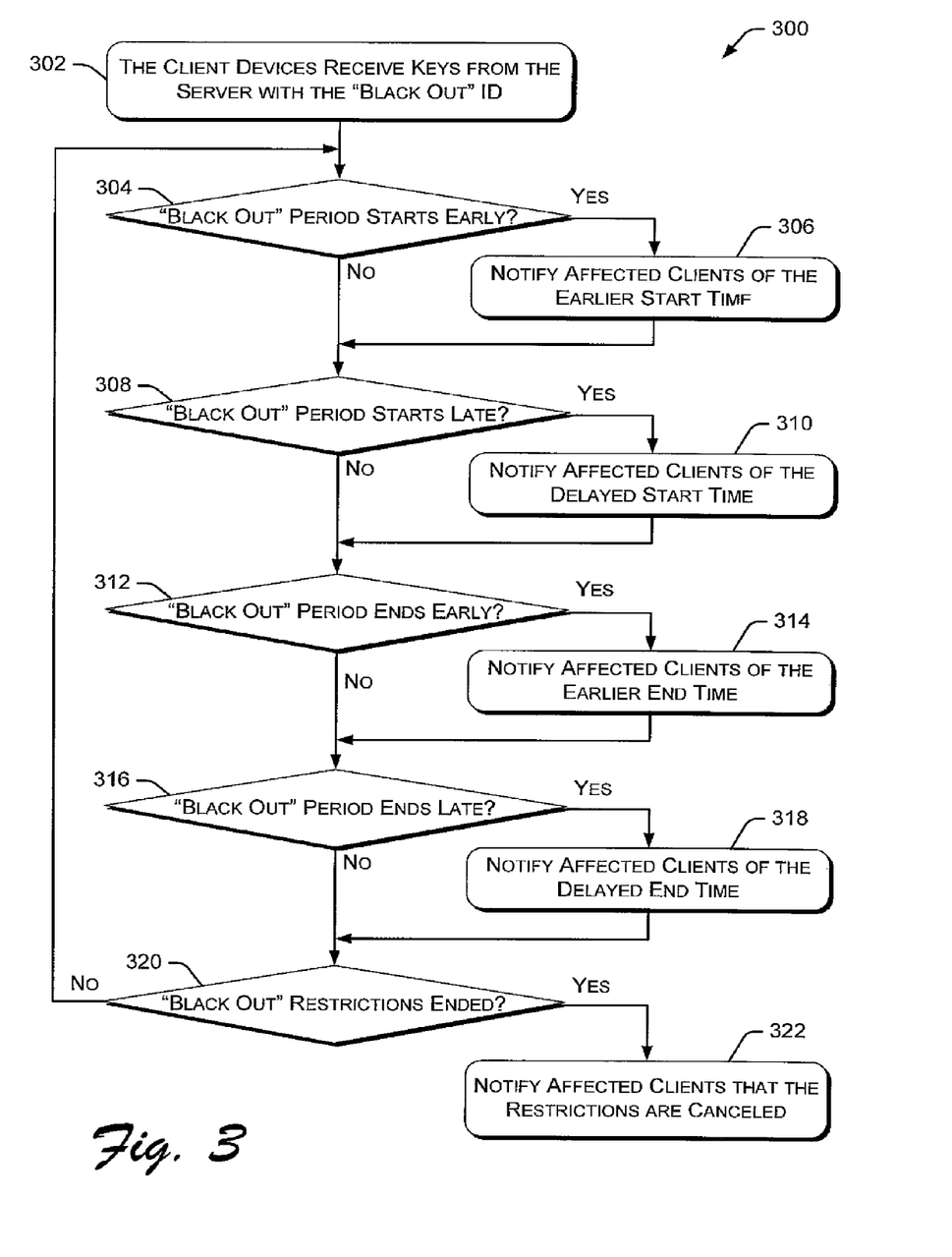
FIG. 3 is a flow diagram illustrating an embodiment of a procedure for handling changes to a scheduled "black out" time period.

FIG. 3 is a flow diagram illustrating an embodiment of a procedure 300 for handling changes to a scheduled "black out" time period. Initially, the client devices receive keys from the server that contain the "blackout" ID (block 302). These modified keys identify the content to be restricted and the time period during which the restriction is scheduled to occur (e.g., during the scheduled time of a particular sporting event). At block 304, the procedure determines whether the "black out" period started early (e.g., the sporting event started earlier than scheduled). If so, the procedure branches to block 306 to notify the affected clients of the earlier start time, thereby causing the affected clients to begin restricting access to the content at the new time. In a particular embodiment, the restricted event may have already started. In this situation, client devices are notified to begin restricting content immediately.

Procedure 300 continues at block 308 by determining whether the "black out" period will be starting late (e.g., the sporting event will start later than scheduled). If so, the procedure branches to block 310 to notify the affected clients of the delayed start time, thereby causing the affected clients to delay restricting access to the content until the delayed start time. This notice avoids disruption of the display of the content that precedes the restricted content.

At block 312, the procedure determines whether the "black out" period will be ending early (e.g., the sporting event will finish earlier than scheduled). If so, the procedure branches to block 314 to notify the affected clients of the earlier end time, thereby causing the affected clients to stop restricting access to the content at the earlier end time. This notice avoids disruption of the display of the content that follows the restricted content.

At block 316, the procedure determines whether the "black out" period will be ending late (e.g., the sporting event will finish later than scheduled). If so, the procedure branches to block 318 to notify the affected clients of the delayed end time, thereby causing the affected clients to stop restricting access to the content at the later time.

Finally, at block 320, procedure 300 determines whether the "black out" restrictions have ended. If the "black out" restrictions have not ended, the procedure branches back to block 304 to watch for any changes to the time period associated with the "black out" restrictions. If the "black out" restrictions have ended, the procedure notifies clients that the restrictions are canceled (block 322). Thus, the client device can again gain access to the previously restricted channel or content.

The program substitution systems and methods described herein make use of rights management data structures to communicate service substitution events to client devices. In one embodiment, a boundary key and key identifier data structures are utilized. Boundary keys are used to encrypt the streaming video content. When client devices obtain boundary keys from the rights management system, the keys are encapsulated in a data structure that includes the keys themselves as well as rights and metadata about the keys. This includes such information as the key ID, the key expiration, and the signature of the key. Example elements associated with the boundary key data structure are summarized in Table 1 below.

TABLE 1

| Element Name | Description |
| --- | --- |
| Blackout Present | Indicates if Service Substitutionblackout fields are included in this structure |
| SessionKeyID | Key Identifier GUID of the session key that protects this key |
| KeyID | Key Identifier GUID |
| E(Key) | Encrypted boundary key |

TABLE 1-continued

| Element Name | Description |
| --- | --- |
| BlackoutIDs | Client has rights to decrypt this service when this Blackout ID is active |
| Signature | Signature of this structure formed using the session key |

Key identifier structures are contained within the encrypted video streams. The key identifier structures point to the boundary keys that were used to encrypt the video. Example members of the key identifier data structure are summarized in Table 2 below.

TABLE 2

| Element Name | Description |
| --- | --- |
| StartSampleID | ID of first sample for which this key is valid |
| SampleIDlength | Number of samples over which this key can be used |
| KeyID | Key Identifier GUID |
| BlackoutID | Samples in the Sample ID range have this blackout ID associated with them (0 => no blackout is active) |
| Signature | Signature of this structure formed using the key specified by the KeyID |

To signal a program substitution event, the encryption system in acquisition server 102 (FIG. 1) sets the BlackoutID field in the key identifier data structure that's encapsulated with the video stream to the appropriate value. This informs all devices that are tuned to that video stream that the program substitution is active starting with the indicated sample ID. Client devices tuned to the service evaluate their rights whenever the KeyID or the BlackoutID changes in the key identifier data structure. If the client device detects a non-zero BlackoutID in the key identifier data structure but does not have the corresponding BlackoutID in its boundary key data structure, then the client won't decode the video stream. Instead, the client will attempt to tune to the next secondary stream that's part of the service collection. The BlackoutID in the key identifier data structure continues to signal the program substitution for the entire duration of the program substitution event. Thus, the client device will be informed of the active program substitution, regardless of when a client device tunes to the blacked out stream.

Client devices get their keys and associated rights information by polling rights database 114 (FIG. 1). To improve system security, the keys themselves are periodically rotated, normally every 30 minutes. So, in addition to the keys that are currently in force, the client also gets (normally) three sets of keys that it can use in the future. Having multiple sets of keys stored on the client reduces the real-time requirements placed on the overall system.

The phrase "getting the keys" means that the client obtains the boundary key data structures to the services for which the client is provisioned. Rights database 114 and/or notification server 116 (FIG. 1) generates encrypted sets of keys and rights for the client whenever the client requests them. When keys are generated for a device, rights database 114 checks to see if there are any program substitution events defined within the time period for which the key is generated. If a program substitution has been prescheduled on the service, and the client device is not part of a subscriber group that will be included in the program substitution, then the BlackoutID is included in the boundary key data structure. Since there could be multiple BlackoutIDs associated with a service over any key rotation period, there may be several BlackoutIDs included in the boundary key data structure.

To ensure that no devices are blacked-out that shouldn't be, every key that could potentially be used during a program substitution period needs to have the correct rights information. Since keys are distributed to client devices several key rotations before they're used, program substitutions must be pre-scheduled at least that far in advance of the anticipated program substitution. This way, the first time the client gets a key it will have the correct rights included in the boundary key data structure.

BlackoutIDs within the IPTV system are unique within a key rotation time and within a service. Identical BlackoutIDs can exist at the same time on different services per branch. As program substitution events are added for a service to the acquisition point database the system generates a database sequence number, which is the BlackoutID. The internal BlackoutID is an 8-bit number, with 0 reserved for the no-service substitution case. As a result, Blackout IDs on a service roll over every 255 program substitution events. So, the full description of a program substitution includes the BlackoutID, the ServiceID, and a date/time stamp.

To minimize the complexity of supporting program substitutions within the client device, the number of unique BlackoutIDs for any individual service is limited to 16 per key rotation period. If more than 16 program substitution events are needed on a service within the nominal key rotation period, the key rotation period is decreased for time period in question.

Since program substitution events aren't aligned precisely to key rotation periods, only 14 BlackoutIDs are unique to one key rotation period. The other 2 of the 16 possible IDs are shared with the preceding and subsequent period. Note that within any key rotation period, the total number of possible program substitution events is 16 times the total number of services supported by the system.

While program substitutions must be prescheduled at least (key rotation period) times (key look-ahead number) in advance, the actual signal to start or stop the program substitution happens in (near) real-time. There are two mechanisms for signaling the start or stop of a program substitution—in-band with the video signal using SCTE-35 (Society of Cable Telecommunications Engineers) signaling, or out-of-band via the management web service interface. Typically, each video stream has only one program substitution active at any one time, so a "program substitution stop" signal for a stream turns off any program substitution on that stream. Program substitution start and stop signals can be carried out-of-band with respect to the video stream. The entry point into the IPTV system for these signals is through the management web service.

Scheduled program substitutions and prescheduled program substitutions with variable start and end times start and stop in a similar manner. The start and stop events are posted in the live acquisition service database 112 (FIG. 1). Acquisition server 102 periodically polls the database to get configuration information, rights, and boundary keys. When the blackoutID is posted in the key identifier data structure, acquisition server 102 uses the key and associated rights information as part of applying rights management to the video stream. This action starts the program substitution. Similarly, when the key identifier data structure changes back to clear the blackoutID, the primary video stream is no longer blacked out.

Since acquisition server 102 only changes the key identifier data at polling intervals, the polling intervals for those acquisition servers carrying primary streams that can be blacked out needs to be very small. The polling interval for the acquisition server is configurable per server. In order to maintain overall performance of the system, acquisition servers that do not service program substitution-able primary streams are configured for the nominal polling interval.

Program substitutions involve replacing a primary video stream with an alternate video stream based on the location of the client device. The program substitution system supports a flexible method of defining the relationship between these video streams, and allows the network operator or content provider to make last-minute decisions about the best video stream to use as an alternate. Video streams are grouped together into "service collections" that are used to associate various video streams together for a variety of purposes.

A service collection may include a primary video stream and one or more secondary video streams. In the case of a program substitution, there will be one primary video stream, one secondary video stream used as alternate content during the program substitution, and an optional secondary video stream used as a barker channel for those subscribers who aren't provisioned for viewing the video streams.

For many applications, a static relationship may exist between the primary video stream and the alternate video stream substituted in the case of a program substitution, it's sometimes advantageous for this relationship to be more flexible. To provide more flexibility, the program substitution system provides for having different secondary video streams in different locales, and for switching between secondary video streams. The SubstitutionEvent object contains an ordered list of subscriber groups with associated blacked out video streams and substituted video streams. In this manner, different subscriber groups (which map to locales) can, in general substitute different primary video streams with different alternate video streams.

To allow for flexibility in selecting alternate content, the program substitution system pushes notifications to the subscriber groups to incrementally update their SI tables with new information. In one embodiment, the SI updates are multicast to subscriber groups every 15 seconds If there are no updates, the message is null. However, if there are updates, the multicast message includes the ID of the affected subscriber groups, the primary service ID, the ID of the new, preferred alternate (or secondary) program, and the program substitution ID associate with this SI change. The change remains in effect until either the program substitution is ended or the streams get updated with a new incremental SI message.

To ensure that the SI updates cannot be hacked (by, for example, blocking the multicast notifications), the notifications are signed and sent repeatedly for the duration of the program substitution. Additionally, if the client device doesn't receive a multicast SI update message (including null messages), then the client will detune, set the video output to black, and go to a "dead" state.

Program Substitution Event

An example program substitution event is described below and defined by the following attributes:

```
public class SubstitutionEvent {
    public System.Guid SubstitutionEventId;
    public string ExternalSubstitutionId;
    public bool DisableICC;
    public SubscriberGroup[ ] SubscriberGroupIDs;
    public System.DateTime WindowStart;
    public System.DateTime WindowEnd;
```

-continued

```
    public System.DateTime Start;
    public System.DateTime End;
    public System.DateTime ActualStart;        // read only
    public System.DateTime ActualEnd;          // read only
    public ServiceInfo PrimaryMain;
    public short MainBlackoutId;               // read only
    public ServiceInfo PrimaryPip;
    public short PipBlackoutId;                // read only
    public SubscriberServiceId[ ] Alternates;
    public SubstitutionState Status;
        public System.DateTime                 // read only
        LastStatusChange;
    public System.DateTime CreateDate;
    public System.DateTime UpdateDate;
}
```

SubstitutionEventId

GUID representing the identifier of the substitution event. This value is returned from the CreateSubstitution call.

ExternalSubstitutionID

String representing a unique name for the blackout.

Disable ICC

Disables Instant Channel Change for switching between primary and alternate video streams as part of the service substitution.

SubscriberGroupIds[ ]

An array of Subscriber Group Id's:

```
    public class SubscriberGroup {
        public string GroupName;
        public System.Guid GroupId;
    }
```

Window Start Date & Time

Identifies the start of the window in which the service must maintain rights information for a substitution event. This is at least (key rotation period) times (the length of the key rotation list), normally two hours, before the earliest time that the substitution event can start. Format is UTC, GMT time.

Window End Date & Time

Identifies the end of the window in which the service must maintain rights information for a substitution event. This is at least (key rotation period) times (the length of the key rotation list), normally two hours, after the latest time that the substitution event can end. This is particularly important for events that may last longer than the scheduled end time, for example a game that goes into overtime. Format is UTC, GMT time.

Start Date & Time

Scheduled start of substitution. This is updateable inside the two hour window. This value can be left blank to support a completely manual substitution scenario. UpdateSubstitution can then pass in a start/end datetime at the time execution (See SLA for start/end of substitution). Format is UTC, GMT time.

End Date & Time

Scheduled end time. This value is used to send the end notification to end the substitution. It is updateable up to the end of the substitution window. This value can be left blank to support a completely manual substitution scenario. UpdateSubstitution can then pass in a actual start/end datetime at the time execution (See SLA for start/end of substitution). Format is UTC, GMT time.

Actual Start Date & Time

This is the time at which the substitution event actually started. Format is UTC, GMT time.

Actual End Date & Time

This is the time at which the substitution event actually ended. Format is UTC, GMT time.

PrimaryMain

Id of the primary service to blackout.

MainBlackoutID

The 8-bit ID that's used internally to the rights management system to identify the blackout of the main service.

PrimaryPIP

Id of the primary PIP

PIPBlackoutID

The 8-bit ID that's used internally to the rights management system to identify the blackout of the PIP service.

Alternates[ ]

Mapping of alternate service IDs to service groups:

```
    public class Subscriber ServiceId {
        public SubscriberGroup[ ] SGroups;
        public ServiceInfo MainService;
        public ServiceInfo PIPService;
    }
```

Status

The current state of the substitution event.

The following states are supported within the service substitution system to provide callers to the management API with status for a blackout event.

Scheduled—This status is the value that's set when the SubstitutionEvent is created.

Executing—This is the value that's set on the back-end when the A server is currently including the blackoutID in the PrimaryMain service or on the branch when the blackout start notification has been sent.

Complete—This is the value that's set on the back-end when the A server is no longer including the blackoutID in the PrimaryMain service or on the branch when the blackout end notification has been sent.

ErroredStart—Past the scheduled start time but the start event hasn't happened.

ErroredFinish—Past the scheduled start time but the end event hasn't happened.

Calls to the DeleteSubstitutionEvent method removes the event from the system. There's no record maintained in the blackout database of the event after deletion (however the OSS WS does log calls to this method).

LastStatusChange

The date and time at which the Status value was last changed. Format is UTC, GMT time.

CreateDate

The date and time at which the substitution event was created via the CreateSubstitution method. Format is UTC, GMT time.

UpdateDate

The date and time at which the substitution event was last updated via the UpdateSubstitution method. Format is UTC, GMT time.

The program substitution system also supports reporting, monitoring, and auditing of program substitution-related events.

Server logs

The Service Substitution system logs calls made to the management APIs and the results of those calls. Server logs may include information such as: database errors, SubstitutionEvent is null, No Subscriber Groups defined, No PrimaryMain defined, No StartTime defined, ExternalsubstitutionID is empty, No Id in SubstitutionEvent, SubstitutionEventID, and ExternalsubstitutionID. Events will include the time of the event and the ID of the substitution event (where available).

Client Logs

Clients affected by a program substitution log into client activity logs when the client device acts upon a program substitution and when the program substitution is discarded (either by tuning to another channel or by the program substitution system lifting the program substitution).

Client activity logs include various event information, such as information related to Blackout_Start, Blackout_End, and Blackout_Service_Change.

Auditing Support

The network operator obtains audit information by data-mining both the server logs and the client activity logs for events applicable to the service substitution ID of interest. Archived service substitutions are normally retained by the substitution system for a minimum of 13 months.

Program Substitution Monitoring

The management API provides the ability monitor the state of program substitutions. The following Read APIs can be used to pull status change:
    ReadSubstitutionEventsByDateRange
    ReadSubstitutionEventsByExternalId
    ReadSubstitutionEventsForSubscriberGroup
    ReadSubstitutionEventsForSub-
        scriberGroupByDateRange
    ReadAllSubstitutionEvents The Read web services scale to allow a poll interval as small as one second for all blackout events in the 24 hour period surrounding the current time.

Troubleshooting

The program substitution system provides a management interface that lists all devices within a substitution region, and all substitution regions for a device. Customer-specific solutions engineers are able use this interface to implement to the specific access method of the customer For example, one network operator may reference client devices through the MAC address, while another may reference client devices by their Device ID. The ability to list all substitution regions and all GRCs within each region is provided.

Management API Authentication

The program substitution system ensures that only authenticated machines can make program substitution calls to the OSS APIs.

Program Substitution Enforcement

The program substitution system enforces service substitutions such that a subscriber cannot defeat or override the service substitution by manipulating, blocking, or otherwise modifying the content stream or control messages that come over the network to the client device.

Service Substitution Event Control

Service substitutions can be defined and scheduled through web service calls to the management API.

Substitution Content Source

The IPTVE system supports two sources of substitute content used during a program substitution, replacing the content with a standard channel and replacing the content with a secondary or alternate content source.

Standard Channel Source

A standard channel is an existing channel available to client devices in its channel map. For example, during a simultaneous service substitution the original channel, WDIV-TV NBC (Detroit, Mich.), will be replaced for the duration of a substitution by CTV (Windsor, Ontario); and both WDIV and CTV are available as channels to which the subscriber can channel surf.

Alternate Content Source

The source content for a program substitution can also be made up of one or more streams of video that the subscriber wouldn't normally be able to view. This alternate content may be defined at preschedule time, or it may be determined at the start of or even during the program substitution duration.

Reliability

The Service Substitution system ensures that no device within a program substitution group can access blacked-out content for more that five seconds.

Scheduled Events

The program substitution system begins and ends scheduled program substitutions within five seconds of the scheduled time relative to the content stream at the video acquisition point.

Prescheduled Events with Variable Start/Stop Times

The program substitution system starts and stops prescheduled program substitution events having manual start and/or stop times within 25 seconds of the corresponding call to the management API or the management GUI.

Non-preseheduled Events

The program substitution system does not support program substitution events that aren't prescheduled at least 2 hours (nominally) before the start of the program substitution. The actual time is variable per IPTV system and is the product of the key rotation period and the key update backlog, both of which are configurable. This only applies to the scheduling and not actual start/end of the event.

Figure 4:
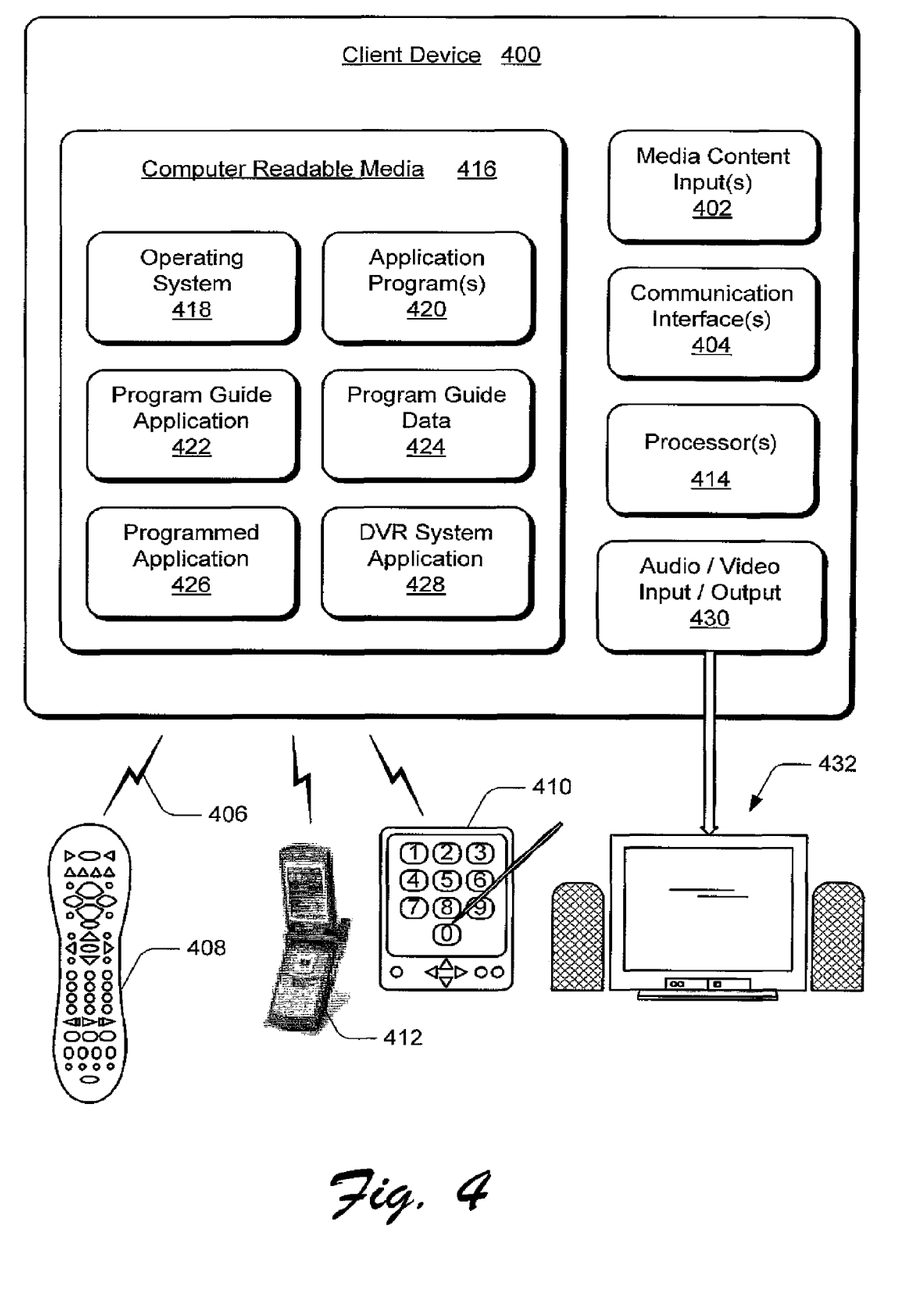
FIG. 4 illustrates various components of an example client device in which the systems and methods discussed herein can be implemented.

FIG. 4 illustrates various components of an exemplary client device 400 which can be implemented as any form of a computing, electronic, and/or television-based client device, and in which the systems and methods discussed herein can be implemented.

Client device 400 includes one or more media content inputs 402 which may include Internet Protocol (IP) inputs over which streams of media content are received via an IP-based network. Device 400 further includes communication interface(s) 404 which can be implemented as any one or more of a serial and/or parallel interface, a wireless interface, any type of network interface, a modem, and as any other type of communication interface. A wireless interface enables client device 400 to receive control input commands 406 and other information from an input device, such as from remote control device 408, PDA (personal digital assistant) 410, cellular phone 412, or from another infrared (IR), 802.11, Bluetooth, or similar RF input device.

A network interface provides a connection between the client device 400 and a communication network by which other electronic and computing devices can communicate data with device 400. Similarly, a serial and/or parallel interface provides for data communication directly between client device 400 and the other electronic or computing devices. A modem facilitates client device 400 communication with other electronic and computing devices via a conventional telephone line, a DSL connection, cable, and/or other type of connection.

Client device 400 also includes one or more processors 414 (e.g., any of microprocessors, controllers, and the like) which process various computer executable instructions to control the operation of device 400, to communicate with other electronic and computing devices, and to implement the embodiments described herein. Client device 400 can be implemented with computer readable media 416, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 416 provides data storage mechanisms to store various information and/or data such as software applications and any other types of information and data related to operational aspects of client device 400. For example, an operating system 418 and/or other application programs 420 can be maintained as software applications with the computer readable media 416 and executed on processor(s) 414 to implement the systems and methods discussed herein.

For example, client device 400 can be implemented to include a program guide application 422 that is implemented to process program guide data 424 and generate program guides for display which enable a user to navigate through an onscreen display and locate broadcast programs, recorded programs, video on-demand programs and movies, interactive game selections, network-based applications, and other media access information or content of interest to the user. The computer readable media 416 can also include a programmed application 426 to implement features and embodiments described herein. The computer readable media 416 can also include a DVR system application 428 to maintain and playback recorded media content.

Although the programmed application 426 is illustrated and described as a single application configured to implement embodiments described herein, the programmed application 426 can be implemented as several component applications distributed to each perform one or more functions in a client device in a television-based entertainment and information system. Further, the program guide application 422 may include the programmed application 426 as an integrated module or component.

The client device 400 also includes an audio and/or video output 430 that provides audio and video to an audio rendering and/or display system 432, or to other devices that process, display, and/or otherwise render audio, video, and display data. Video signals and audio signals can be communicated from device 400 to a television (or to other types of display devices) via an RF (radio frequency) link, S-video link, composite video link, component video link, analog audio connection, or other similar communication link.

Figure 5:
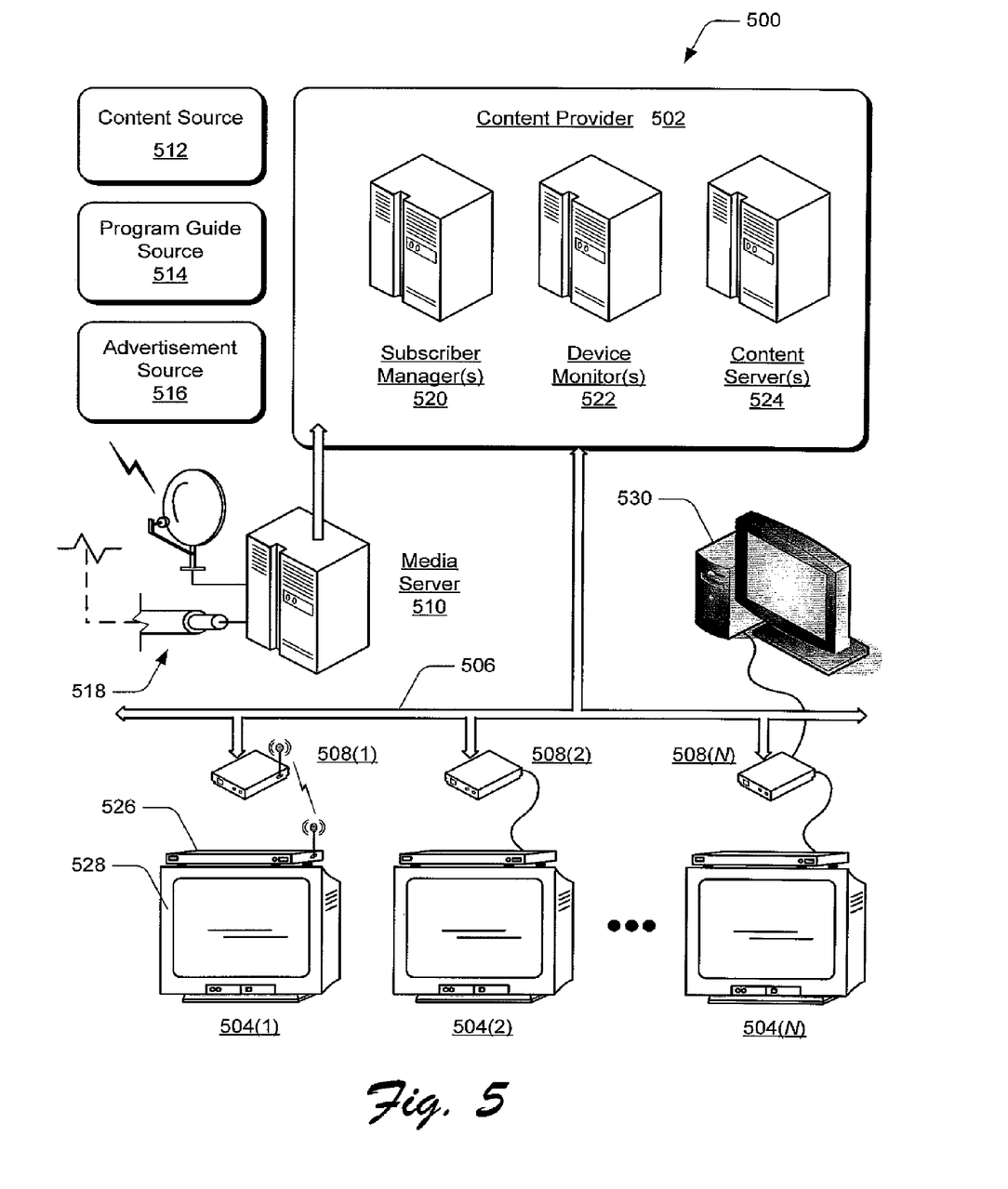
FIG. 5 illustrates various devices and components in an example entertainment and information system in which the systems and methods discussed herein can be implemented.

FIG. 5 illustrates an exemplary entertainment and information system 500 in which an IP-based television environment can be implemented, and in which embodiments discussed herein can be implemented. System 500 facilitates the distribution of program content, program guide data, and advertising content to multiple users. System 500 includes a content provider 502 and television-based client systems 504(1-N) each configured for communication via an IP-based network 506.

The network 506 can be implemented as a wide area network (e.g., the Internet), an intranet, a Digital Subscriber Line (DSL) network infrastructure, or as a point-to-point coupling infrastructure. Additionally, network 506 can be implemented using any type of network topology and any network communication protocol, and can be represented or otherwise implemented as a combination of two or more networks. A digital network can include various hardwired and/or wireless links 508(1-N), routers, gateways, and so on to facilitate communication between content provider 502 and the client systems 504(1-N). The television-based client systems 504 (1-N) receive program content, program guide data, advertising content, closed captions data, and the like from content server(s) of the content provider 502 via the IP-based network 506.

System 500 includes a media server 510 that receives program content from a content source 512, program guide data from a program guide source 514, and advertising content from an advertisement source 516. In an embodiment, the media server 510 represents an acquisition server that receives the audio and video program content from content source 512, an EPG server that receives the program guide data from program guide source 514, and/or an advertising management server that receives the advertising content from the advertisement source 516.

The content source 512, the program guide source 514, and the advertisement source 516 control distribution of the program content, the program guide data, and the advertising content to the media server 510 and/or to other television-based servers. The program content, program guide data, and advertising content is distributed via various transmission media 518, such as satellite transmission, radio frequency transmission, cable transmission, and/or via any number of other wired or wireless transmission media. In this example, media server 510 is shown as an independent component of system 500 that communicates the program content, program guide data, and advertising content to content provider 502. In an alternate implementation, media server 510 can be implemented as a component of content provider 502.

Content provider 502 is representative of a headend service in a television-based content distribution system, for example, that provides the program content, program guide data, and advertising content to multiple subscribers (e.g., the television-based client systems 504(1-N)). The content provider 502 can be implemented as a satellite operator, a network television operator, a cable operator, and the like to control distribution of program and advertising content, such as movies, television programs, commercials, music, and other audio, video, and/or image content to the client systems 504(1-N).

Content provider 502 includes various components to facilitate media data processing and content distribution, such as a subscriber manager 520, a device monitor 522, and a content server 524. The subscriber manager 520 manages subscriber data, and the device monitor 522 monitors the client systems 504(1-N) (e.g., and the subscribers), and maintains monitored client state information.

Although the various managers, servers, and monitors of content provider 502 (to include the media server 510 in one embodiment) are illustrated and described as distributed, independent components of content provider 502, any one or more of the managers, servers, and monitors can be implemented together as a multi-functional component of content provider 502. Additionally, any one or more of the managers, servers, and monitors described with reference to system 500 can implement the features and embodiments discussed herein.

The television-based client systems 504(1-N) can be implemented to include a client device 526 and a display device 528 (e.g., a television). A client device 526 of a television-based client system 504 can be implemented in any number of embodiments, such as a set-top box, a digital video recorder (DVR) and playback system, a personal video recorder (PVR), an appliance device, a gaming system, and as any other type of client device that may be implemented in a television-based entertainment and information system. In an alternate embodiment, client system 504(N) is implemented with a computing device 530 as well as a client device 526. Additionally, any of the client devices 526 of a client system 504 can implement the features and embodiments described herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, comprising:
   distributing a first plurality of keys and a number of blackout IDs to a plurality of clients, the first plurality of keys providing access to media content on a channel, the first plurality of keys being periodically rotated such that each of the plurality of clients receives keys that are currently in use and multiple sets of keys that are to be used at a later time, and the number of blackout IDs corresponding to substitutions of the media content being limited to a predetermined number for every key rotation period; if a number of the substitutions exceeds a threshold during a particular one of the key rotation periods, decreasing a time period of the key rotation period; if a number of the substitutions exceeds a threshold during a particular one of the key rotation periods, decreasing a time period of the key rotation period;
   identifying a group of clients from the plurality of clients that are to receive substituted media content on the channel during a predetermined time period, the group of clients being identified based on a client type;
   generating modified keys that identify the substituted media content and the predetermined time period on the channel;
   distributing the modified keys to the clients in the identified group prior to the predetermined time period, the modified keys causing the clients to receive the substituted media content during the predetermined time period on the channel, and the modified keys causing a particular one of the clients to receive alternate media content different from the media content and the substituted media content if the client is not provisioned to render the media content and the substituted media content;
   generating a second plurality of keys prior to a conclusion of the predetermined time period; and
   distributing the second plurality of keys to the clients in the identified group prior to the conclusion of the predetermined time period, the second set of keys causing the clients in the identified group to receive non-substituted media content on the channel.

2. The method as recited in claim 1, wherein the group of clients are in a common geographic area.

3. The method as recited in claim 1, wherein the predetermined time period is associated with a scheduled time of a live event.

4. The method as recited in claim 1, wherein the predetermined time period is associated with a scheduled time of a sporting event.

5. The method as recited in claim 4, further comprising notifying clients in the identified group to stop receiving substituted media content if the sporting event ends prior to an end of the predetermined time period.

6. The method as recited in claim 4, further comprising notifying clients in the identified group to continue receiving substituted media content after the predetermined time period if the sporting event extends past the predetermined time period.

7. The method as recited in claim 4, further comprising notifying clients in the identified group to begin receiving substituted media content prior to the predetermined time period if the sporting events starts prior to the predetermined time period.

8. The method as recited in claim 4, further comprising notifying clients in the identified group to delay receiving substituted media content after the start of the predetermined time period if the sporting event is delayed past a start of the predetermined time period.

9. The method as recited in claim 1, wherein the group of clients are in a common geographic area and the predetermined time period is associated with a scheduled time of a live sporting event being played in the geographic area.

10. A method, comprising:
    identifying an event that restricts distribution of particular content in a geographic region during a time of the event;
    identifying a group of clients associated with the geographic region based on one or more client subscriptions;
    generating a first set of keys that restrict distribution of the particular content in the geographic region during the time of the event, the first set of keys being rotated at least once every key rotation period such that each client within the group of clients receives keys that are currently in use and an additional set of keys that are to be used at a later time; and decreasing a time period of the key rotation period when a number of substitutions exceeds a threshold during the key rotation period
    distributing the first set of keys to the identified group of clients, the first set of keys causing the identified group of clients to receive substituted content during the time of the event, the distributing comprising periodically sending notifications to each client in the identified group of clients to determine whether the received substituted content should be updated to a different substituted content;
    generating a second set of keys at a conclusion of the event; and
    distributing the second set of keys to the identified group of clients, the second set of keys causing the identified group of clients to begin receiving unrestricted content.

11. The method as recited in claim 10, wherein the event occurs within the geographic region.

12. The method as recited in claim 10, wherein the event is a live sporting event.

13. The method as recited in claim 10, further comprising notifying the identified group of clients to continue receiving substituted content if the event extends past an expected end time associated with the event.

14. A system comprising:
    a processor; and
    computer-executable instructions that, when executed by the processor, perform operations comprising:
        identifying an event having a scheduled start time and a scheduled end time on a particular channel;
        identifying a group of clients that are to receive substituted media content between the scheduled start time and scheduled end time of the event, the group of clients being identified based on a client type and one or more client subscriptions;
        generating keys that cause the group of clients to receive substituted media content instead of regularly scheduled media content on the particular channel, the keys being periodically rotated such that each client within the group of clients receives keys that are currently in use and keys that are to be used at a later time, and a number of blackout IDs corresponding to substitutions of the media content being limited to a predetermined number for every key rotation period;

if a number of the substitutions exceeds a threshold during the key rotation period, decreasing a time period of the key rotation period;

distributing the keys to the group of clients that are to receive substituted media content and periodically send notifications for a duration of the substituted content to each client of the group of clients to determine whether the received substituted content should be updated to a different substituted content, a particular one of the clients being tuned away from the substituted content and transition to a dead state if the notifications are no longer received;

generating second keys that cause clients to receive non-substituted media content on the particular channel; and distributing the second keys to the group of clients prior to an actual end time of the event, the second keys causing each client of the group of clients to begin receiving regular media content.

15. The system as recited in claim 14, wherein the group of clients are located in a common geographic area.

16. The system as recited in claim 14, wherein the group of clients and the event are located in a common geographic area.

17. The system as recited in claim 14, wherein the substituted media content is provided to the group of clients instead of the regularly scheduled content, and wherein the regularly scheduled content is associated with the event.

18. The system as recited in claim 14, wherein the event is a sporting event.

19. The method as recited in claim 1, wherein the first plurality of keys and the second plurality of keys are each encapsulated in a data structure that includes a key, a digital right, and metadata about the key, the metadata including a key ID, a key expiration time, and a signature of the key.

20. The method as recited in claim 19, wherein each client receiving media content evaluates its rights whenever a change occurs to a key ID or a blackout ID of a key identifier data structure, the key identifier data structure being encapsulated with media content.

* * * * *